United States Patent [19]
Cain et al.

[11] Patent Number: 5,654,018
[45] Date of Patent: Aug. 5, 1997

[54] BEHENIC-RICH TRIGLYCERIDES

[75] Inventors: Frederick William Cain, Voorburg, Netherlands; Stephen Raymond Moore, Thrapston, Great Britain

[73] Assignee: Loders Croklaan B.V., Wormerveer, Netherlands

[21] Appl. No.: 492,463

[22] Filed: Jun. 19, 1995

[30] Foreign Application Priority Data

Jun. 24, 1994 [EP] European Pat. Off. ............. 94304631

[51] Int. Cl.⁶ ..................................................... A23D 7/00
[52] U.S. Cl. .......................... 426/33; 426/601; 426/607; 554/30
[58] Field of Search ........................ 426/60, 607, 33

[56] References Cited

U.S. PATENT DOCUMENTS

| | | | |
|---|---|---|---|
| 3,492,130 | 1/1970 | Harwood. | |
| 4,726,959 | 2/1988 | Momura | 426/607 |
| 4,877,636 | 10/1989 | Koyano | 426/607 |
| 5,066,510 | 11/1991 | Ehrman | 426/607 |
| 5,135,048 | 8/1992 | Itagaki | 426/607 |
| 5,258,197 | 11/1993 | Wheeler | 426/607 |
| 5,324,633 | 6/1994 | Cain | 426/607 |
| 5,366,752 | 11/1994 | Cain | 426/607 |
| 5,380,544 | 1/1995 | Klemann | 426/607 |
| 5,424,091 | 6/1995 | Cain | 426/610 |
| 5,439,700 | 8/1995 | Cain | 426/607 |
| 5,508,048 | 4/1996 | Padley | 426/33 |

FOREIGN PATENT DOCUMENTS

| | | | |
|---|---|---|---|
| 0 126 416 | 11/1984 | European Pat. Off. | C11C 3/10 |
| 0 422 490 A2 | 4/1991 | European Pat. Off. | A61K 31/23 |
| 0 427 309 A3 | 5/1991 | European Pat. Off. | C11C 3/08 |
| 0 563 593 A1 | 10/1993 | European Pat. Off. | A23L 1/19 |
| 1205729 | 9/1970 | United Kingdom. | |

OTHER PUBLICATIONS

Sonnet et al, JAOCS, vol. 70, No. 4, pp. 387–391 (Apr., 1993).

Patent Abstracts of Japan, vol. 13, No. 290 (Jul., 5, 1990).

Chemical Abstracts, vol. 103, No. 25, Abstract No. 213793 (Dec. 23, 1985).

Derwent Publications Ltd., AN 91–263093.

Swern ed 1979 Bailey's Industrial Oil and Fat Products vol. 1, 4th ed. J. Wiley & Sons New York pp. 29, 30, 413–422.

Heller 1993 Research Disclosure 350:408.

*Primary Examiner*—Carolyn Paden
*Attorney, Agent, or Firm*—Cushman Darby & Cushman IP Group Pillsbury Madison & Sutro LLP

[57] ABSTRACT

The invention concerns a new process for the preparation of novel fats, comprising SUS- and SSU-triglycerides high in behenic acid, wich are predominantly in $\beta^1$-crystal form. According to the process a high erucic oil is hydrolyzed to form a dierucic diglyceride, this diglyceride is hydrogenated to dibehenic diglyceride, which is converted enzymically to a reaction-mixture from which the novel fats are separated.

5 Claims, No Drawings

BEHENIC-RICH TRIGLYCERIDES

BACKGROUND OF THE INVENTION

Although fats, rich in behenic acid, such as BOB or BBO can be made by methods disclosed in the prior art, these methods always have draw-backs which make their product less suitable for application in food products. A conventional route for preparing those fats e.g. is a chemical interesterification (using a base, such as sodium methanolate as catalyst) of a high oleic oil, such as high oleic sunflower and a hardened fat, high in behenic acid, such as hardened high erucic rapeseed oil. However, the products so obtained can only contain maximum 30 wt % behenic acid. Although this content can be increased by a fractionation, such a fractionation would also lead to an increased BBB-content, which would deteriorate the oral properties of the fat.

An alternative route nowadays is an enzymic conversion of fats or of a fat with an acid. We found, that such an enzymic conversion of a fat and an acid leads to products, wherein the triglycerides have high levels of BOB and low levels of BBO. These triglyceride mixtures crystallize readily in the β(v)-stable crystal form. This is a drawback, as these triglcyerides in general have high melting points. Further these β-stable triglycerides are not well compatible with triglycerides that are in $\beta^1$-crystalform, as is required for many food-applications, such as spreads. An enzymic process based on the conversion of fats, so e.g. hardened high erucic rapeseed oil with high oleic sunflower oil, will lead to products, that will contain mixed saturated triglycerides such as BStB, while the process further will result in a randomized product from which the composition is determined by the ratio of the starting fats.

Another disadvantage of the above processes, is the uneconomical use that is made of the fatty acids, present in the starting materials. We have studied whether we could find an improved route for the production of triglycerides, rich in behenic acid, wherein the fatty acid residues present in the starting material (e.g. high erucic rapeseed oil) are used in the most efficient way. This new route should enable us to produce triglyceride-compositions, wherein the triglcyerides are predominently in $\beta^1$-crystal form so that they combine a high behenic content with an acceptable (or even a good) melt characteristic and are well compatible with $\beta^1$-fats in food products. The fats than will be very suitable for application in food products, e.g. as a blend with another fat or oil. It is emphasized here that high behenic contents are very advantageous, as such high contents are believed to make the fats less absorbed by the human-body and thus to make the fats lower calorie-fats.

It should be noted, that BOB-rich triglycerides, that are $\beta_2$-stable are disclosed in the Manufact. Confectioneer, November 1989, page 63. These fats are only used in chocolate based materials, because of their $\beta_2$-crystal-form.

SUMMARY OF THE INVENTION

Therefore our invention concerns both novel triglyceride-compositions that are rich in behenic acid and that upon blending with other oils or fats provide useful low calorie fat compositions and a novel process to make these triglyceride-compositions, wherein the fats comprise SUS- and SSU-type triglycerides, S being saturated fatty acid with at least 16 C-atoms; U being oleic acid or linoleic acid, wherein the SUS-level is at least 25 wt %
the SSU-level is at least 15 wt %
more than 70 wt % of the total saturated fatty acids consist of behenic acid
the behenic acid-content of the total composition is at least 30 wt %
while the triglycerides are predominantly in the $\beta^1$-crystal form.

In these triglycerides U preferably is oleic and/or linoleic; most preferably these $C_{18:1}$ and $C_{18:2}$ residues are present in a weight ratio between (95:5) and (5:95), preferably a weight-ratio of (2:1)–(4:1).

DETAILED DESCRIPTION OF THE INVENTION

The SUS/SSU weight-ratio in our fats vary broadly, suitable ratio's range from 2 to 20, however, we prefer the triglycerides, wherein this ratio is 3–5, as these fats display the best melting profile and can be used to prepare products with optimal consistency and processability.

The most profitable fats are obtained, when the SUS-content of our novel triglycerides is more than 40 wt %, preferably more then 60 wt %. Simultaneously the SSU-content of our triglycerides preferably should be more than 25 wt %. The fats that fulfil the above criteria will have the highest behenic contents, while the melting properties are still good. Preferred behenic acid contents of our triglyceride-compositions are 50–80 wt %, most preferably 60–70 wt %.

In our most preferred triglycerides the saturated fatty acids consists for more than 90 wt % of behenic acid.

Our triglyceride composition can contain some limited amount of BBB, in general this amount will be between 0.5 and 15 wt %, preferably between 1 and 5 wt %.

Our fats are used in food products as blends with other fats. In most instances the fats present in these food products are in $\beta^1$-crystal form, so that our fats are well-compatible with the fats present. Very suitable blends are obtained by blending of our novel fats with other fats in weight-ratios of (10:90) to (90:10), preferably (30:70)–(70:30). Fats with an $N_{35}$<15, preferably <10, most preferably <5 (for the blend) can be obtained. The other fat can be selected from liquid oils (e.g. Sunflower oil, Palm oil, high oleic sunflower oil, safflower oil, soybean oil, rapeseed oil, olive oil etc.), hardened liquid oils (in particular partially hardened), fractions thereof ( in particular the olein-fraction) or mixtures thereof. Our novel blends can be applied in all kind of food products, wherein a fat phase is present. Examples thereof are: margarines, spreads, confectionery coatings, in particular coatings based on non-SUS-fats, cream alternatives, etc.

Our fats can be made by an economically feasible new route. This route is based on the finding that dierucin can be made by an enzymic hydrolysis process. This process is disclosed by McNeill (see McNeill, Sonnet, 1994 Annual Meeting abstracts, page 550, C of the Annual Meeting of the American Oil Chem. Soc.). According to this abstract a dierucin can be made from high erucic rapeseed oil, wherein the dierucin-content of the end-product can be as high as 95 wt %.

So our novel process for the production of our novel triglycerides comprises the steps of:
(1) an oil is selected, that is high in erucic acid, preferably having an erucic acid content of more than 30 wt %.
(2) the oil of (1) is subjected to an enzymic hydrolysis, using an enzyme specific for the production of a diglyceride.
(3) a diglyceride, rich in dierucin is separated from the crude reaction product of (2).

(4) the dierucin is catalytically hydrogenated to dibehenic.
(5) the dibehenic is esterified enzymically in the presence of free fatty acids, rich in oleic acid and/or linoleic acid.
(6) a mixture of triglycerides with the composition according to claim 1 is separated from the crude reaction product (5).

In step (2) a lipase is applied, preferably selected from the group of *Pseudomonas cepacia*, *Geotrichum candidum* and *Candida rugosa*.

The separation in step (3), is preferably performed by a distillation and/or fractionation, separating a dierucin with a erucic acid content of more than 80 wt %, preferably more then 90 wt %. The catalytic hydrogenation in step (4) can be performed by conventional hydrogenation methods, applying conventional catalysts. The hardened product can be subjected to solvent fractionation. This will increase the amount of 1.3-diglycerides in the product.

The enzymic conversion of step (5) is performed by a lipase, that does not react with long chain fatty acids. An ideal lipase is *Candida Rugosa*.

As byproduct in step (3) liberated fatty acids are obtained. Those fatty acids can be recycled to step (5), either as such or after a purification. This recycling of these fatty acids makes our process economically attractive, as this recycling enables us to use all fatty acids originally present in the starting high erucic fat.

Although the product of the hydrolysis in step (2) is mainly a 1.3-diglyceride, we found that the end product is a mixture of BOB and BBO-triglycerides. This is unexpected, but simultaneously advantageous as well, as a mixture of the two different glycerides will display a better (=lower) melting point than the triglyceride components per se.

EXAMPLE I

1) High Erucic Acid Rape (HEAR) oil was enzymically hydrolysed to produce a diglyceride rich product:

a) 100:25:0.1 by weight HEAR oil, 0.1M phosphate buffer solution (pH7), *Candida rugosa* lipase enzyme (100,000 LU/g) were stirred at 9° C. for 24 hours. After the reaction, excess water was decanted off, and the product dried at 110° C.

The FAME profile (wt %) of the HEAR oil was:

| | |
|---|---|
| 16:0 | 3.1 |
| 16:1 | 0.2 |
| 18:0 | 1.0 |
| 18:1 | 13.3 |
| 18:2 | 13.3 |
| 18:3 | 8.6 |
| 20:0 | 0.6 |
| 20:1 | 7.8 |
| 20:2 | 0.5 |
| 22:0 | 0.5 |
| 22:1 | 48.9 |
| 22:2 | 0.8 |
| 24 | 1.2 | i.e. an erucic acid content of 48.9 wt %.

The fat phase of the hydrolysis reaction was measured to be 30.1 wt % DG and 1 wt % MG. The erucic acid content of the diglyceride was 88.2 wt % (measured by FAME analysis) and rich in C44 diglycerides (Carbon number analysis):

| | |
|---|---|
| 12:0 | 0.4 |
| 14:0 | 0.3 |
| 16:0 | 1.2 |
| 16.1 | 0.0 |
| 18:0 | 1.2 |
| 18:1 | 0.9 |
| 18:2 | 0.6 |
| 18:3 | 0.3 |
| 20:0 | 0.8 |
| 20:1 | 3.2 |
| 22:0 | 0.9 |
| 22:1 | 88.2 |
| 24 | 1.2 |
| C34 | 0.0 |
| C36 | 1.1 |
| C38 | 1.4 |
| C40 | 2.1 |
| C42 | 8.5 |
| C44 | 83.8 |
| C46 | 3.1 |

2) A dierucin-rich diglyceride was separated from the reaction products via a two-stage process (silica treatment and high vacuum evaporation).

a) The diglyceride content was enriched by a two stage silica treatment.

i) A silica treatment with hexane (2:1:2.8 hexane, oil, silica by weight) was performed at 40° C., followed by a wash with 7.6 parts hexane to 1 part oil (by weight). This left the silica enriched in diglycerides, which was retained.

ii) The diglyceride-enriched silica was washed to remove the diglycerides from the silica (3:1 silica to solvent by weight) with hexane/acetone (88 wt % hexane, 12 wt % acetone) as the solvent. The diglyceride-rich product was recovered by evaporation of the hexane/acetone solvent.

This diglyceride-rich product contained 51.1 wt % DG.

b) The DG-rich blend was passed through a wiped-film evaporator (240° C., 0.9 mbar abs, 400 rpm) to remove any excess FFA. This produced a blend with 73.5 wt % DG and 0 5 wt % FFA.

The DG comprised of 89.7 wt % erucic acid (from FAME analysis):

| | |
|---|---|
| 12:0 | 0.0 |
| 14:0 | 0.0 |
| 16:0 | 0.5 |
| 16:1 | 0.1 |
| 18:0 | 0.3 |
| 18:1 | 0.8 |
| 18:2 | 0.6 |
| 18:3 | 0.4 |
| 20:0 | 0.8 |
| 20:1 | 3.4 |
| 22:0 | 0.9 |
| 22:1 | 89.7 |
| 24 | 0.2 |

Analysis by carbon number showed the diglyceride to be rich in C44:

| | |
|---|---|
| C34 | 0.2 |
| C36 | 1.0 |
| C38 | 1.3 |
| C40 | 2.0 |
| C42 | 8.4 |
| C44 | 84.1 |
| C46 | 3.0 |

3) The erucic-rich DG was fully hardened to produce behenic-rich DG fat.

FAME analysis on the DG fraction of the behenic-rich fat gave the following fatty acid profile (wt %):

| | |
|---|---|
| 12:0 | 0.0 |
| 14:0 | 0.0 |
| 16:0 | 2.5 |
| 16:1 | 0.0 |
| 18:0 | 5.8 |
| 18:1 | 1.9 |
| 18:2 | 0.1 |
| 18:3 | 0.0 |
| 20:0 | 5.1 |
| 20:1 | 0.0 |
| 22:0 | 81.2 |
| 22:1 | 2.1 |
| 24:0 | 1.4 |

Analysis of the DG fraction by carbon number showed:

| | |
|---|---|
| C34 | 0.4 |
| C36 | 2.5 |
| C38 | 2.8 |
| C40 | 2.9 |
| C42 | 9.3 |
| C44 | 78.9 |
| C46 | 3.0 |

The 1,3 and 1,2 DG isomers were present in the ratio 62:38 by weight.

4) The behenic-rich diglyceride fat was enriched by fractionation from hexane. 1 part fat was dissolved in 6 parts hexane solvent, and this was fractionated at 52° C. The diglyceride-rich stearin (98.8 wt % DG) was collected.

The ratio of 1,3 to 1,2 DG isomers was increased to 73:27 by weight.

5) The behenic-rich diglyceride was esterified with oleic acid using the following reaction method:

a) 1 part (by weight) of behenic-rich diglyceride and 0.8 parts oleic acid were dissolved in 15 parts of water-saturated hexane. 0.005 parts of immobilised lipase from Candida rugosa and an additional 0.05 parts of water added at 55° C., and the mixture stirred.

The oleic-rich acid had the following FAME profile (by weight):

| | |
|---|---|
| 12:0 | 0.9 |
| 14:0 | 2.3 |
| 16:0 | 3.9 |
| 16:1 | 0.3 |
| 18:0 | 1.0 |
| 18:1 | 79.5 |
| 18:2 | 11.4 |
| 20 | 0.6 |
| 22 | 0.1 | b) After 2 hours, the reaction temperature was reduced to 49° C. and an additional 0.005 parts of immobilised lipase were added. The reaction was continued for a further 20 hours.

6) Excess diglycerides were separated from the reaction mixture/hexane by mixing with silica (1:5 original behenic-rich DG to silica by weight) and filtering. The filtrate was collected.

The filtrate was passed down an alumina column to remove excess free fatty acid, and the elutant collected. A triglyceride-rich fat (3.7 wt % DG, 0.0% MG) was collected by evaporation of hexane from the elutant.

The final TG composition had the following fatty acid profile by FAME analysis (wt %):

| | |
|---|---|
| 12:0 | 0.6 |
| 14:0 | 1.0 |
| 16:0 | 1.2 |
| 16:1 | 0.2 |
| 18:0 | 0.4 |
| 18:1 | 24.2 |
| 18:2 | 3.7 |
| 18:3 | 0.1 |
| 20:0 | 2.0 |
| 20:1 | 0.1 |
| 22:0 | 65.6 |
| 22:1 | 0.0 |
| 24:0 | 1.1 | and silver phase triglyceride profile (wt %):

| | |
|---|---|
| SSS | 13.2 |
| SOS | 29.7 |
| SSO | 46.3 |
| SLS | 4.5 |
| SSL | 4.9 |
| SOO | 0.5 |
| OSO | 1.0 |
| SOL | 0.0 |
| OOO | 0.0 |
| >3-unsat. | 0.0 | where S represent a saturated fatty acid, O is oleic acid and L is Linoleic acid.

An x-ray analysis confirmed that the fat is in the $\beta^1$-crystal form.

DSC-measurement demonstrated that the fat started melting at 36° C. and was completely melted at 50° C.

Thus the fat had the following composition:
a) 34.2 wt % SUS.
b) 51.2 wt % SSU.
c) 91 wt % of the saturated fatty acids were behenic acid.
d) the total behenic acid content was 65.6 wt %.
e) the oleic acid to linoleic acid ratio was 87:13 by weight.

We claim:

1. Process for the production of a triglyceride-composition comprising SUS and SSU triglycerides, S being saturated fatty acid with at least 16 C-atoms and U being oleic acid or linoleic acid comprising the steps of (1) selecting an oil having an erucic acid content of more than 30 wt. %, (2) subjecting the oil of (1) to an enzymic hydrolysis using an enzyme specific for the production of a diglyceride (3) separating a diglyceride rich in dierucin from the crude reaction product of (2), (4) catalytically hydrogenating the dierucin separated in step (3) to dibehenic, (5) enzymically esterifying the dibehenic obtained in step (4) in the presence of free fatty acids rich in oleic acid and/or linoleic acid, and (6) separating a mixture of SUS and SSU triglycerides from reaction product of step (5), said mixture having a SUS-level of at least 25 wt. %, a SSU-level of at least 15 wt. %, more than 70 wt. % of total saturated fatty acids consisting of behenic acid, a behenic acid content of at least 30 wt. % based on total composition, and wherein the triglycerides are predominantly in the β'-crystal form.

2. Process according to claim 1, wherein step (2) is carried out by using a lipase selected from the group of *Pseudomonas cepacia*, *Geotrichum candidum* and *Candida rugosa*.

3. Process according to claim 1, wherein step (3) is performed by a distillation and/or fractionation and separating a dierucin with an erucic acid content of more than 80 wt %.

4. Process according to claim 1, wherein step (5) is performed by using a lipase, that does not react with long chain fatty acids.

5. Process according to claim 1, wherein step (3) is performed in such a way that a fraction rich in liberated fatty acids is obtained which fraction, optionally after purification, is recirculated to step (5) of the process.

* * * * *